US012753086B2

(12) United States Patent
Doi et al.

(10) Patent No.: US 12,753,086 B2
(45) Date of Patent: Oct. 6, 2026

(54) LITHIUM-CONTAINING CHLORIDE AND METHOD FOR PRODUCING SAME, SOLID ELECTROLYTE, AND BATTERY

(71) Applicants: SUMITOMO CHEMICAL COMPANY, LIMITED, Tokyo (JP); Kyoto University, Kyoto (JP)

(72) Inventors: Atsunori Doi, Niihama (JP); Hiroshi Kageyama, Kyoto (JP); Cedric Tassel, Kyoto (JP)

(73) Assignees: SUMITOMO CHEMICAL COMPANY, LIMITED, Tokyo (JP); Kyoto University, Kyoto (JP)

( * ) Notice: Subject to any disclaimer, the term of this patent is extended or adjusted under 35 U.S.C. 154(b) by 446 days.

(21) Appl. No.: 18/579,813

(22) PCT Filed: Jul. 19, 2022

(86) PCT No.: PCT/JP2022/028081

§ 371 (c)(1),
(2) Date: Jan. 16, 2024

(87) PCT Pub. No.: WO2023/002989

PCT Pub. Date: Jan. 26, 2023

(65) Prior Publication Data

US 2024/0317600 A1 Sep. 26, 2024

(30) Foreign Application Priority Data

Jul. 21, 2021 (JP) ................................ 2021-120799
Mar. 31, 2022 (JP) ................................ 2022-060357

(51) Int. Cl.
*C01G 15/00* (2006.01)
*C01G 25/00* (2006.01)
(Continued)

(52) U.S. Cl.
CPC ......... *C01G 15/006* (2013.01); *C01G 25/006* (2013.01); *C01G 33/006* (2013.01);
(Continued)

(58) Field of Classification Search
None
See application file for complete search history.

(56) References Cited

U.S. PATENT DOCUMENTS

2022/0216507 A1 7/2022 Sun et al.

FOREIGN PATENT DOCUMENTS

CN 113097559 A 7/2021
CN 113130980 A 7/2021
WO 2020/220697 A1 11/2020

OTHER PUBLICATIONS

Notice of Reasons for Revocation for Japanese Patent No. 7174181 accorded Opposition No. 2023-700511 on Sep. 11, 2023.
(Continued)

*Primary Examiner* — Jonathan Crepeau
(74) *Attorney, Agent, or Firm* — Rimon P.C.

(57) ABSTRACT

A compound has a monoclinic crystal structure in which, in an X-ray diffraction chart obtained by performing measurement using CuKα ray at 25° C., a half value width of a reflection peak having the greatest peak height in a 2θ angle range of 10 to 18° is 0.05 to 0.35°, and which contains lithium, a metal element M other than lithium, chlorine and a dopant element X, in which a molar content of lithium is 20 to 40 mol %, a molar content of chlorine is 50 to 70 mol %, and an activation energy is 0.380 eV or less.

11 Claims, 14 Drawing Sheets

(51) Int. Cl.
*C01G 33/00* (2006.01)
*C01G 35/00* (2006.01)
*H01M 10/0562* (2010.01)

(52) U.S. Cl.
CPC ...... *C01G 35/006* (2013.01); *H01M 10/0562* (2013.01); *C01P 2002/72* (2013.01); *C01P 2006/40* (2013.01); *H01M 2300/008* (2013.01)

(56) References Cited

OTHER PUBLICATIONS

International Preliminary Report on Patentability issued in PCT Application No. PCT/JP2022/028081 on Feb. 1, 2024.

Y. Tomita et al., "Substitution effect of ionic conductivity in lithium ion conductor, LI3INBR6-xCLx," Solid State Ionics, vol. 179, Issues 21-26, Sep. 15, 2008, p. 867-p. 870.

Park,Dong-Su et al., "Theoretical Design of Lithium Chloride Superionic Conductors for All-Solid-State High-Voltage Lithium-Ion Batteries", ACS Appl. Mater. Interfaces, 2020, vol. 12, p. 34806-p. 34814.

Bianca Helm et al., "Exploring Aliovalent Substitutions in the Lithium Halide Superionic Conductor Li3-xln1-xZrxCl6" Chemistry of Materials, 2021, 33, p. 4773-p. 4782.

International Search Report issued in International Application No. PCT/JP2022/028081, dated Sep. 20, 2022 w/English Translation.

Office Action issued in corresponding Japanese Application No. 2022-060357, dated Jun. 21, 2022 w/English Translation.

Office Action received in Japanese Patent Application No. 2022-060357, dated Apr. 5, 2024 (Notice of Grounds for Revocation regarding patent opposition No. 2023-700511).

LITHIUM-CONTAINING CHLORIDE AND METHOD FOR PRODUCING SAME, SOLID ELECTROLYTE, AND BATTERY

CROSS-REFERENCE TO RELATED APPLICATIONS

This application is the U.S. National Phase under 35 U.S.C. § 371 of International Application No. PCT/JP2022/028081, filed on Jul. 19, 2022, which claims the benefit of foreign priority to JP Patent Application No. 2021-120799 filed on Jul. 21, 2021 and JP Patent Application No. 2022-060357, filed Mar. 31, 2022, the entire contents of each of which are hereby incorporated by reference.

TECHNICAL FIELD

The present disclosure relates to a lithium-containing chloride, a method for producing the same, a solid electrolyte and a battery.

BACKGROUND ART

In recent years, solid electrolytes have been attracting attention as electrolytes used in electrochemical devices such as lithium ion batteries (Patent Literature 1 and Non-Patent Literature 1). Since solid electrolytes have better high temperature durability and high voltage resistance than conventional electrolytic solutions, they are considered useful for improving battery performance such as with regard to safety, high capacity, rapid charging and discharging, and pack energy density.

As solid electrolytes containing lithium, oxides such as $Li_7La_3Zr_2O_{12}$ (LLZO), halides such as $Li_3InCl_6$ and $LiYBr_6$, and sulfides such as $Li_{10}GeP_2S_{12}$ are known.

CITATION LIST

Patent Literature

[Patent Literature 1] PCT International Publication No. WO 2020/220697

Non-Patent Literature

[Non-Patent Literature 1] Y. Tomita et al., "Substitution effect of ionic conductivity in lithium ion conductor, $LI_3INBR_{6-x}CL_x$", Solid State Ionics, Volume 179, Issues 21-26, 15 Sep. 2008, Pages 867-870.

SUMMARY OF INVENTION

Technical Problem

Here, halides have advantages of being more flexible than oxides, and safer than sulfides that can release harmful $H_2S$, but halides have a problem of lower ion conductivity (lithium ion conductivity) than sulfides.

The present disclosure has been made in view of the above circumstances, and an object of the present disclosure is to provide a lithium-containing chloride having high ion conductivity. In addition, an object of the present disclosure is to provide a solid electrolyte and battery containing a lithium-containing chloride, and a method for producing the lithium-containing chloride.

Solution to Problem

A compound of the present disclosure has a monoclinic crystal structure wherein, in an X-ray diffraction chart obtained by performing measurement using CuKα ray at 25° C., a half value width of a reflection peak having the greatest peak height in a 2θ angle range of 10 to 18° is 0.05 to 0.35°, and which contains lithium, a metal element M other than lithium, chlorine and a dopant element X, in which a molar content of lithium is 20 to 40 mol %, a molar content of chlorine is 50 to 70 mol %, and the activation energy is 0.380 eV or less.

In addition, a compound of the present disclosure has a monoclinic crystal structure wherein, in an X-ray diffraction chart obtained by performing measurement using CuKα ray at 25° C., a half value width of a reflection peak having the greatest peak height in a 2θ angle range of 10 to 18° is 0.05 to 0.35°, and which contains lithium, a metal element M other than lithium, chlorine and a dopant element X, in which a molar content of lithium is 20 to 40 mol %, a molar content of chlorine is 50 to 70 mol %, and when a solid-state $^6$Li-NMR spectrum is measured at room temperature under conditions in which a $^6$Li nucleus resonance frequency is 44.1 MHz, and no spinning occurs, a half value width of a peak present within a chemical shift range of −50 to +50 ppm is 1 to 7 ppm, based on a chemical shift of a 1 mol/L LiCl aqueous solution being 1.19 ppm.

Preferably, the compound has a crystal structure belonging to a space group C2/m.

Preferably, the metal element M is a trivalent metal element.

Preferably, the metal element M is indium.

Preferably, the compound is represented by Formula: $Li_\alpha M_\beta Cl_{6-\delta} X_\varepsilon$, where $2 \le \alpha \le 3.5$, $0.5 \le \beta \le 1.1$, $0 \le \delta \le 1$, and $0 < \varepsilon \le 0.7$.

Preferably, the compound is represented by Formula: $Li_\alpha In_\beta Cl_{6-\delta} X_\varepsilon$, where $2 \le \alpha \le 3.5$, $0.5 \le \beta \le 1.1$, $0 \le \delta \le 1$, and $0 < \varepsilon \le 0.7$.

Preferably, the compound is represented by $Li_\alpha M_\beta Cl_{6-\delta} X1_{\varepsilon 1} X2_{\varepsilon 2}$, where $2 \le \alpha \le 3.5$, $0.5 \le \beta \le 1$, $0 \le \delta \le 1$, $0 < \varepsilon 1 \le 0.7$, and $0 < \varepsilon 2 \le 0.7$.

A solid electrolyte of the present disclosure includes the compound.

A battery of the present disclosure includes the compound.

A method for producing the compound of the present disclosure includes the following steps (1) and (2):

(1) a first step of performing ball milling on raw materials to obtain a crude product; and (2) a second step of annealing the crude product obtained in the first step at a temperature of 100° C. or higher.

Advantageous Effects of Invention

According to the present disclosure, it is possible to provide a lithium-containing chloride having high ion conductivity. In addition, according to the present disclosure, it is possible to provide a solid electrolyte and battery containing the lithium-containing chloride, and a method for producing the lithium-containing chloride.

DESCRIPTION OF EMBODIMENTS

Figure 1:
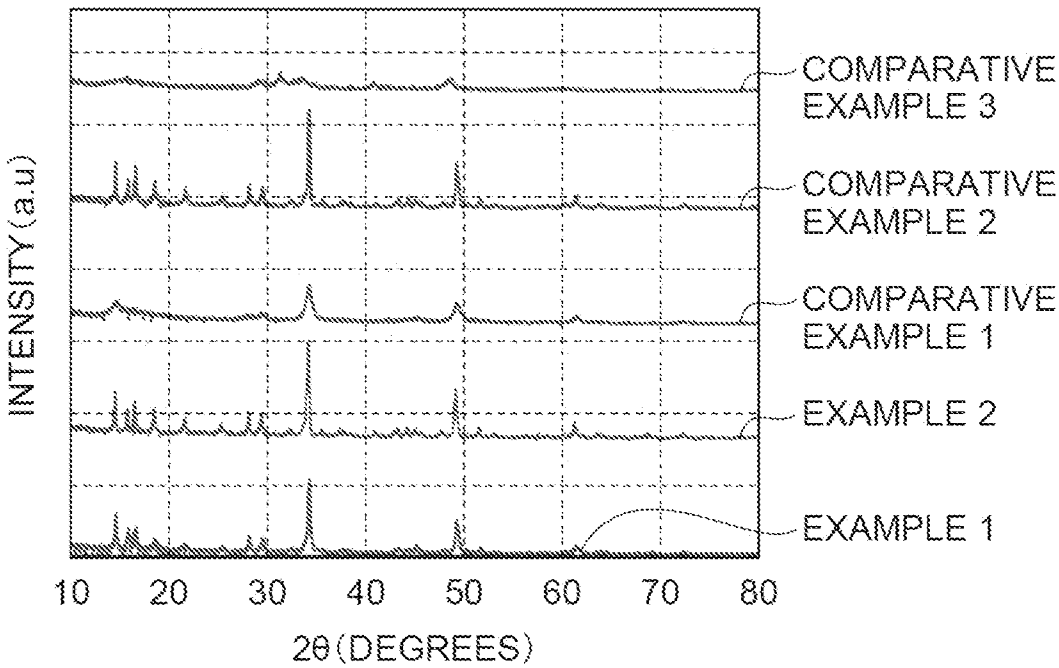
FIG. 1 shows an X-ray diffraction chart of lithium-containing chlorides of Examples 1 and 2, and Comparative Examples 1 to 3.

A compound according to the present embodiment has a monoclinic crystal structure in which, in an X-ray diffraction chart obtained by performing measurement using CuKα ray at 25° C., a half value width of a reflection peak having the greatest peak height in a 2θ angle range of 10 to 18° is 0.05 to 0.35°, and which contains lithium, a metal element M other than lithium, chlorine and a dopant element X, in which a molar content of lithium is 20 to 40 mol %, a molar content of chlorine is 50 to 70 mol %, and at least one of the following (A) and (B) is satisfied:

(A) The activation energy is 0.380 eV or less.

(B) When a solid-state $^{6}$Li-NMR spectrum is measured at room temperature under conditions in which the $^{6}$Li nucleus resonance frequency is 44.1 MHZ, and no spinning occurs, a half value width of a peak present within a chemical shift range of −50 to +50 ppm is 1 to 7 ppm, based on a chemical shift of a 1 mol/L LiCl aqueous solution being 1.19 ppm.

Here, in the following, the compound of the present embodiment is also referred to as a lithium-containing chloride. In addition, in this specification, the term half value width means a full width at half maximum. The lithium-containing chloride of the present embodiment may satisfy only one of the above (A) and (B), and may satisfy both. Here, unless otherwise specified, in this specification, the solid-state $^{6}$Li-NMR spectrum is measured at room temperature under conditions in which the $^{6}$Li nucleus resonance frequency is 44.1 MHZ, and no spinning occurs, and the chemical shift is a chemical shift based on a chemical shift of a 1 mol/L LiCl aqueous solution being 1.19 ppm.

The lithium-containing chloride of the present embodiment has high ion conductivity (lithium ion conductivity). The inventors have noticed that there is a correlation between the ion conductivity of the lithium-containing chloride having a monoclinic crystal structure and a half value width of a specific reflection peak (reflection peak having the greatest peak height in a 2θ angle range of 10 to 18°) in an X-ray diffraction chart. That is, in the lithium-containing chloride of the present embodiment, in the X-ray diffraction chart obtained by performing measurement using CuKα ray at 25° C., the half value width of a reflection peak having the greatest peak height in a 2θ angle range of 10 to 18° is 0.05 to 0.35°, and the width of the reflection peak is very narrow compared to conventional lithium-containing chlorides (for example, Comparative Example 1). Thus, as shown in examples, such lithium-containing chlorides have higher ion conductivity than conventional lithium-containing chlorides.

The lithium-containing chloride of the present embodiment preferably has a crystal structure belonging to a space group C2/m.

In addition, the lithium-containing chloride of the present embodiment has a lower activation energy and higher mobility of lithium ions in a solid than conventional lithium-containing chlorides (for example, Comparative Examples 2 and 3). In addition, the inventors also found that there is a correlation between a half value width of a peak present within a chemical shift range of −50 to +50 ppm in the solid-state $^{6}$Li-NMR spectrum and the ion conductivity. As actually shown in examples, the lithium-containing chloride of the present embodiment has a narrower peak in the solid-state $^{6}$Li-NMR spectrum and higher ion conductivity than conventional lithium-containing chlorides (for example, Comparative Examples 2 and 3).

The half value width of the specific reflection peak in the X-ray diffraction chart is preferably 0.10 to 0.35°, more preferably 0.15 to 0.35°, and still more preferably 0.15 to 0.30°.

The activation energy is preferably 0.370 eV or less, more preferably 0.360 eV or less, and still more preferably 0.350 eV or less. The activation energy can be determined by performing curve fitting (that is, from an Arrhenius plot) on the graph obtained by measuring the conductivity of the lithium-containing chloride while changing the temperature T based on the following calculation formula.

$$\sigma T = A\exp(-E_a/k_bT) \quad \text{Formula}$$

Here, σ represents ion conductivity (S/cm), T represents absolute temperature (K), A represents frequency factor, Ea represents activation energy, and $k_b$ represents the Boltzmann constant.

The half value width of a peak present within a chemical shift range of −50 to +50 ppm in the solid-state $^{6}$Li-NMR spectrum is preferably 2 to 7 ppm, more preferably 3 to 6.8 ppm, and still more preferably 3.5 to 6.8 ppm.

In the lithium-containing chloride, the molar content of lithium is preferably 25 to 35 mol %. In addition, in the lithium-containing chloride, the molar content of chlorine is preferably 55 to 65 mol %. In addition, in the lithium-containing chloride, the molar content of the metal element M may be 10 mol % or less. Here, in this specification, unless otherwise specified, the molar content is a molar content based on the total number of atoms (mol) contained in the lithium-containing chloride. Here, the chemical composition of the lithium-containing chloride can also be measured through, for example, inductively coupled plasma (ICP) emission spectroscopy, and the halogen element can also be measured through ion chromatography.

Examples of metal elements M contained in the lithium-containing chloride include transition metals, rare earth elements, and p-block metal elements, and specifically, at least one element selected from the group consisting of Al, Ga, In, Sc and La may be used and In is preferable. The metal element M contained in the lithium-containing chloride is preferably an element having a valence of 3.

The dopant element X may be selected from among elements other than Li, the metal element M and Cl, and examples thereof include X1: a metal element other than the metal element M, and X2: at least one element selected from the group consisting of bromine, iodine and phosphorus. The molar content of the dopant element X in the lithium-containing chloride may be 10 mol % or less, 5 mol % or less, or 0.1 to 3 mol %. The lithium-containing chloride may contain only one type of dopant element X or may contain a plurality of types of dopant elements X. The lithium-containing chloride may contain one or both of the dopant element X1 and the dopant element X2.

The dopant element X1 may be an element having a valence different from the metal element M, and is preferably an element having a higher valence than the metal element M. As such a combination, a case in which the metal element M is In, and the dopant element X1 is at least one selected from the group consisting of Zr, Sn, Nb and Ta may be exemplified. When the oxidation number of the dopant element X1 is larger than the oxidation number of the metal element M, it is easier to create voids for lithium sites in the crystal structure and the ion conductivity tends to be higher. The dopant element X1 may be at least one element selected from the group consisting of Zr, Sn, Ti, Nb, Ta, Bi and Y, and is preferably Zr, Sn, Nb, or Ta. Nb and Ta are preferable because an effect of improving the ion conductivity can be obtained with a small amount thereof added.

The dopant element X2 is preferably bromine. The dopant element X2 occupies anion sites in the crystal structure like chlorine, but its atom radius is larger than that of chlorine. Therefore, the crystal lattice expands and thus the lithium ion movement path expands so that the ion conductivity tends to be higher. In addition, it is preferable to combine the dopant elements X1 and X2 because it is possible to obtain a synergistic effect between an effect of creating voids for lithium sites and an effect of expanding the lithium ion movement path. Regarding element selection of the dopant elements X1 and X2, any of the combinations listed above can be used.

The lithium-containing chloride is preferably a compound represented by $Li_{\alpha}M_{\beta}Cl_{6-\delta}X_{\varepsilon}$ and more preferably a compound represented by Formula: $Li_{\alpha}In_{\beta}Cl_{6-\delta}X_{\varepsilon}$. Here, it is preferable that $2\leq\alpha\leq3.5$, $0.5\leq\beta\leq1.1$, $0\leq\delta\leq1$, and $0<\varepsilon\leq0.7$, more preferable that $2\leq\alpha\leq3.5$, $0.5\leq\beta\leq1$, $0\leq\delta\leq1$, and $0<\varepsilon\leq0.7$, and still more preferable that $2.5\leq\alpha\leq3$, $0.7\leq\beta\leq0.95$, $0\leq\delta\leq0.5$, and $0<\varepsilon\leq0.5$. $0.01\leq\varepsilon\leq0.7$ may be satisfied.

Among these, when X is the dopant element X2, $0<\varepsilon\leq0.3$ may be satisfied, $0<\varepsilon\leq0.2$ is preferable, and $0.01\leq\varepsilon\leq0.2$ is more preferable.

When the dopant elements X1 and X2 are combined, a compound represented by Formula: $Li_{\alpha}M_{\beta}Cl_{6-\delta}X1_{\varepsilon1}X2_{\varepsilon2}$ is preferable, and a compound represented by Formula: $Li_{\alpha}In_{\beta}Cl_{6-\delta}X1_{\varepsilon1}X2_{\varepsilon2}$ is more preferable. Here, $2\leq\alpha\leq3.5$, $0.5\leq\beta\leq1$, $0\leq\delta\leq1$, $0<\varepsilon1\leq0.7$, and $0<\varepsilon2\leq0.7$ are more preferable, and $2.5\leq\alpha\leq3$, $0.7\leq\beta\leq0.95$, $0\leq\delta\leq0.5$, $0<\varepsilon1\leq0.3$, and $0<\varepsilon2\leq0.5$ are still more preferable. $0.01\leq\varepsilon1\leq0.7$ may be satisfied. In addition, $0.01\leq\varepsilon2\leq0.7$ may be satisfied, or $0.01\leq\varepsilon2\leq0.3$ may be satisfied.

The method for producing a lithium-containing chloride is not particularly limited, and includes, for example, a production method including a step of performing ball milling on raw materials to obtain a crude product and a step of annealing the crude product.

The raw materials are not particularly limited, and may be, for example, a compound containing lithium chloride, chloride of a metal element M and a dopant element X. When the dopant element is X1, the compound containing the dopant element may be chloride of X1. When the dopant element is X2, the compound containing the dopant element may be lithium bromide or lithium iodide. It is preferable to mix the raw materials before performing ball milling, and it is more preferable to perform mixing in an inert atmosphere (for example, Ar atmosphere).

The ball milling conditions are not particularly limited, and ball milling can be performed at a rotation speed of 200 to 700 rpm for 10 to 100 hours. The crushing time is preferably 24 hours to 72 hours, and more preferably 36 to 60 hours.

The balls used in ball milling are not particularly limited, and zirconia balls can be used. The size of balls to be used is not particularly limited, and balls of 2 mm to 10 mm can be used.

When ball milling is performed for the above time, the raw materials are sufficiently mixed, the mechanochemical reaction is promoted, and thus the ion conductivity of the obtained compound can be improved.

Annealing is preferably performed in an inert atmosphere or in a vacuum. For example, the annealing temperature is preferably 150 to 300° C., and more preferably 200 to 250° C. The annealing time may be, for example, 1 to 10 hours, and is preferably 3 to 6 hours. When annealing is performed, the size of crystallites tends to increase. When the annealing temperature is within the above temperature range, it is possible to control the crystallite size to an appropriate size. In addition, accordingly, a change also occurs in the local structure around Li in the compound, and is effective in controlling the half value width of a peak present within a chemical shift range of −50 to +50 ppm in the $^{6}Li$-NMR spectrum to a half value width value range of 1 to 7 ppm, or more preferably 2 to 7 ppm described above.

In addition, it is possible to obtain a synergistic effect by combining the above ball milling conditions and annealing conditions in appropriate ranges.

Since the lithium-containing chloride of the present embodiment has excellent lithium ion conductivity, it can be used in an electrolyte (a solid electrolyte containing a lithium-containing chloride, etc.) for lithium ion batteries.

(Lithium Ion Battery Using Lithium-Containing Chloride of the Present Embodiment as Solid Electrolyte)

It is possible to produce a lithium ion battery using the lithium-containing chloride of the present embodiment as a solid electrolyte.

The positive electrode of the lithium ion battery is not particularly limited, and contains a positive electrode active material and as necessary, may contain a conductive aid, a binding agent and the like. In addition, the positive electrode may contain the lithium-containing chloride of the present embodiment.

The positive electrode may be one in which a layer containing these materials is formed on a current collector. Examples of positive electrode active materials include a lithium-containing composite metal oxide containing lithium (Li), and at least one transition metal selected from the group consisting of V, Cr, Mn, Fe, Co, Ni, and Cu. Examples of such lithium composite metal oxides include $LiCoO_2$, $LiNiO_2$, $LiMn_2O_4$, $Li_2MnO_3$, $LiNi_xMn_yCo_{1-x-y}O_2$ [0<x+y<1]), $LiNi_xCo_yAl_{1-x-y}$ $O_2$[0<x+y<1]), $LiCr_{0.5}Mn_{0.5}O_2$, $LiFePO_4$, $Li_2FeP_2O_7$, $LiMnPO_4$, $LiFeBO_3$, $Li_3V_2(PO_4)_3$, $Li_2CuO_2$, $Li_2FeSiO_4$, and $Li_2MnSiO_4$.

The negative electrode of the lithium ion battery is not particularly limited, and may contain a negative electrode active material and as necessary, a conductive aid, a binding agent and the like. Examples thereof include metals such as Li, Si, Sn, Si—Mn, Si—Co, Si—Ni, In, and Au and alloys containing these metals, carbon materials such as graphite, and substances in which lithium ions are inserted between the carbon material layers.

The material of the current collector is not particularly limited, and may be a single metal element such as Cu, Mg, Ti, Fe, Co, Ni, Zn, Al, Ge, In, Au, Pt, Ag, or Pd or an alloy thereof.

A plurality of solid electrolyte layers may be used. For example, a structure having a sulfide solid electrolyte layer in addition to the solid electrolyte layer of the present embodiment may be used. A structure having a sulfide solid electrolyte layer between the solid electrolyte of the present embodiment and a negative electrode may be used. The sulfide solid electrolyte is not particularly limited, and examples thereof include $Li_6PS_5Cl$, $Li_2S—PS_5$, $Li_{10}GeP_2S_{12}$, $Li_{9.6}P_3S_{12}$, $Li_{9.54}Si_{1.74}P_{1.44}S_{11.7}Cl_{0.3}$, and $Li_3PS_4$.

A secondary battery produced using the lithium-containing chloride of the present embodiment as a solid electrolyte can be charged and discharged with a relatively high current value even at room temperature. This is considered to be due to the fact that the lithium-containing chloride of the present embodiment has high ion conductivity and can also form a favorable interface with an active material.

EXAMPLES

Example 1

<Preparation of Lithium-Containing Chloride>

Ball Mill

In an argon atmosphere having a dew point of −70° C. or lower (hereinafter referred to as a dry argon atmosphere), 0.4257 g of LiCl, 0.7044 g of $InCl_3$, and 0.0784 g of $ZrCl_4$ were weighed out to prepare raw materials.

The raw materials were put into a zirconia pot for planetary ball milling described below, and 65 g of zirconia balls with a diameter of 4 mm were added. The mixture was mechanochemically reacted for 48 hours under a condition of 380 rpm, and thereby a crude composition of Example 1 was obtained.

Planetary ball milling device: PM 400 (commercially available from Verder Scientific)

Annealing

The crude composition of Example 1 obtained above was heated in an argon atmosphere at 230° C. for 5 hours, and thereby a compound (lithium-containing chloride) of Example 1 having a preparation composition of $Li_{2.89}In_{0.91}Zr_{0.096}Cl_6$, was obtained.

<Evaluation of Crystal Structure>

The crystal structure of the obtained compound of Example 1 was evaluated by powder x-ray diffraction measurement at 25° C. Regarding measurement conditions, the powder x-ray diffraction measurement was performed under the following conditions.

Measurement device: Ultima IV (commercially available from Rigaku Corporation)

X-ray generator: CuKα source voltage 40 kV, current 40 mA

X-ray detector: scintillation counter

Measurement range: diffraction angle 2θ=10° to 80°

Scan speed: 4°/min

Sample preparation: powderization by mortar crushing

The X-ray diffraction patterns obtained by measurement are shown in FIG. 1.

As a result of analysis, the crystal structure was belonged to a monoclinic space group C2/m. The half value width of a reflection peak having the greatest peak height in a 2θ range of 10 to 18° was 0.25°.

<NMR Evaluation>

Solid-state $^6$Li-NMR measurement was performed on the obtained compound of Example 1 under the following conditions, and the local structure environment of Li was evaluated.

Device: AVANCE300 (commercially available from Bruker)

Observation nucleus: $^6$Li (44.1 MHz as the $^6$Li nucleus resonance frequency)

Magic angle spinning (MAS) frequency: 0 kHz (no spinning)

Measurement method: single pulse method (using standard pulse sequence zg, commercially available from Bruker)

Excitation pulse width: π/4 pulse

Waiting time and cumulative number of measurements: 40 seconds, 128 or 512

Measurement temperature: room temperature (24° C.)

Figure 2:
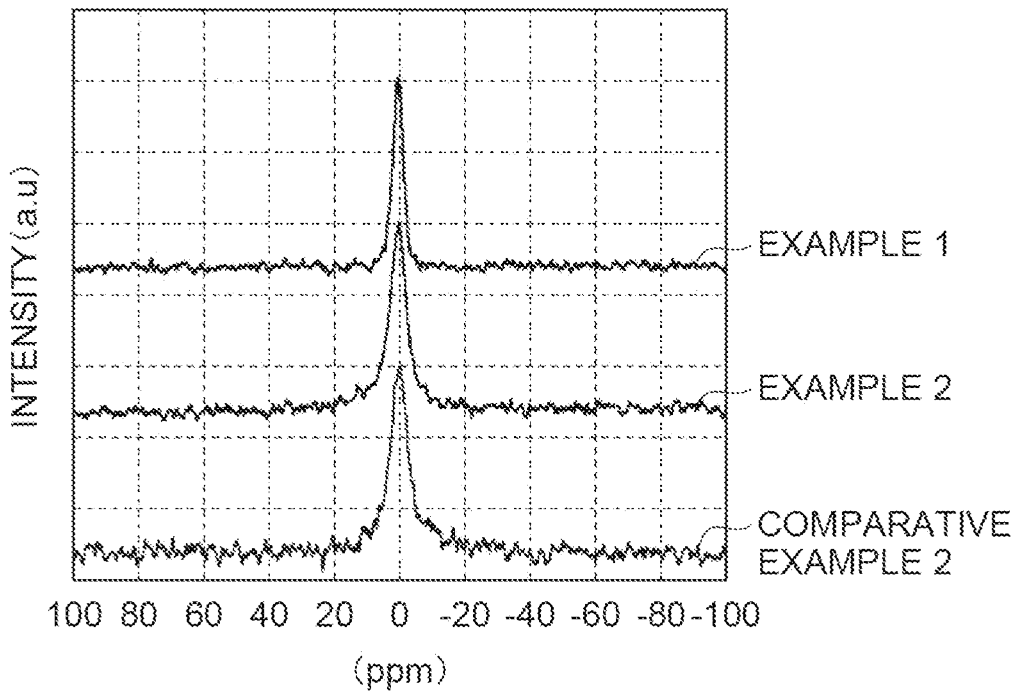
FIG. 2 shows solid-state $^6$Li-NMR spectrums of lithium-containing chlorides of Examples 1 and 2, and Comparative Example 2.

Reference substance: peak observed for a 1 mol/L LiCl aqueous solution was set to 1.19 ppm The obtained spectrums are shown in FIG. 2.

Since one peak was observed in a range of −50 to 50 ppm, Lorentzian fitting was performed, and the half value width was calculated. The results are shown in Table 2.

<ICP Emission Spectroscopy>

The solid electrolyte of Example 1 was subjected to ICP emission spectroscopy using a device (5110 ICP-AES, commercially available from Agilent Technologies), and content proportions of Li, In, and Zr were determined.

In addition, the content proportions of Cl and Br were determined through ion chromatography method.

In both cases, water dissolution was performed as a pretreatment.

The results are shown in Table 2.

<Evaluation of Ion Conductivity>

A pressure molding die including a frame, a punch lower part and a punch upper part was prepared. Here, the frame was formed of an insulating polycarbonate. In addition, both the punch upper part and the punch lower part were formed of electronically conductive stainless steel, and were electrically connected to terminals of an impedance analyzer (S11260, commercially available from Solatron Analytical).

Using the pressure molding die, by the following method, the ion conductivity of the lithium-containing chloride of Example 1 was measured. First, in a dry argon atmosphere, the lithium-containing chloride powder of Example 1 was loaded onto the punch lower part inserted into the hollow part of the frame from vertically below. Then, by pushing the punch upper part into the hollow part of the frame from above, a pressure of 200 MPa was applied to the lithium-containing chloride powder of Example 1 inside the pressure molding die. The impedance of the lithium-containing chloride of Example 1 was measured by the electrochemical impedance measurement method using the impedance analyzer while pressure was applied.

A Cole-Cole diagram graph was created from the impedance measurement results. In the Cole-Cole diagram, the actual value of the impedance at the measurement point at which the absolute value of the phase of the complex impedance was the smallest was considered as the resistance value for ion conduction of a halide solid electrolyte material. Using the resistance value, the ion conductivity was calculated based on the following numerical expression (III).

$$\sigma = (R_{SE} \times S/t)^{-1} \quad \text{(III)}$$

Here,

- σ is the ion conductivity,
- S is the area of the lithium-containing chloride in contact with the punch upper part (equal to the cross-sectional area of the hollow part of the frame),
- $R_{SE}$ is the resistance value of the solid electrolyte material in impedance measurement, and
- t is the thickness of the lithium-containing chloride when pressure is applied.

Table 2 shows the value of ion conductivity at 25° C. Measurement was performed when the temperature reached 25° C. in a thermostatic chamber and was then maintained for 90 minutes or longer.

In addition, in a temperature range of −35° C. to 100° C., measurement was performed at six temperature points including 25° C., curve fitting was performed based on the Arrhenius' equation, and the calculated activation energies are shown in Table 1. At each temperature point, measurement was performed when the temperature reached a set temperature in a thermostatic chamber and was then maintained for 90 minutes or longer. Table 2 shows the calculated activation energies.

In a dry argon atmosphere, 29 parts by mass of the compound of Example 1, 67 parts by mass of $LiNi_{1/3}Mn_{1/3}Co_{1/3}O_2$, and 4 parts by mass of acetylene black were weighed out, and mixed in a mortar to obtain a mixture.

In an insulating cylinder with an inner diameter of 10 mm, 100 mg of the lithium-containing chloride of Example 1 and 15 mg of the mixture were laminated in order to obtain a laminate. A pressure of 200 MPa was applied to the laminate, and a first electrode (a layer of the mixture) and a first solid electrolyte layer (a layer of the lithium-containing chloride) were formed.

Next, 60 mg of a solid electrolyte $Li_6PS_5Cl$ was brought into contact with the first solid electrolyte layer to obtain a laminate. A pressure of 200 MPa was applied to the laminate, and a second solid electrolyte layer was formed. The first solid electrolyte layer was inserted between the first electrode and the second solid electrolyte layer.

Next, 60 mg of a In foil was brought into contact with the second solid electrolyte layer, and additionally, 2 mg of a Li foil was brought into contact with the In foil to obtain a laminate. A pressure of 200 MPa was applied to the laminate, and a second electrode was formed.

A current collector formed of stainless steel was attached to the first electrode and the second electrode, and a lead wire was then attached to the current collector. All the members were placed in a desiccator and sealed, and thus a secondary battery of Example 1 was obtained.

<Charging and Discharging Test>

The charging and discharging test was performed using the following machine product.

Charging and discharging test machine: TOSCAT-3100 (commercially available from Toyo System Co., Ltd.)

The charging and discharging test was performed at 25° C. at three C rates: 0.1 C, 1 C and 3 C.

The current values at respective C rates are shown in Table 1.

Charging was performed to 3.7 V at a current density corresponding to each C rate at a constant current and constant voltage (CCCV charge). Table 1 shows the current densities corresponding to respective C rates.

For discharging, discharging was performed to 1.9 V at a current density corresponding to each C rate.

Figure 3:
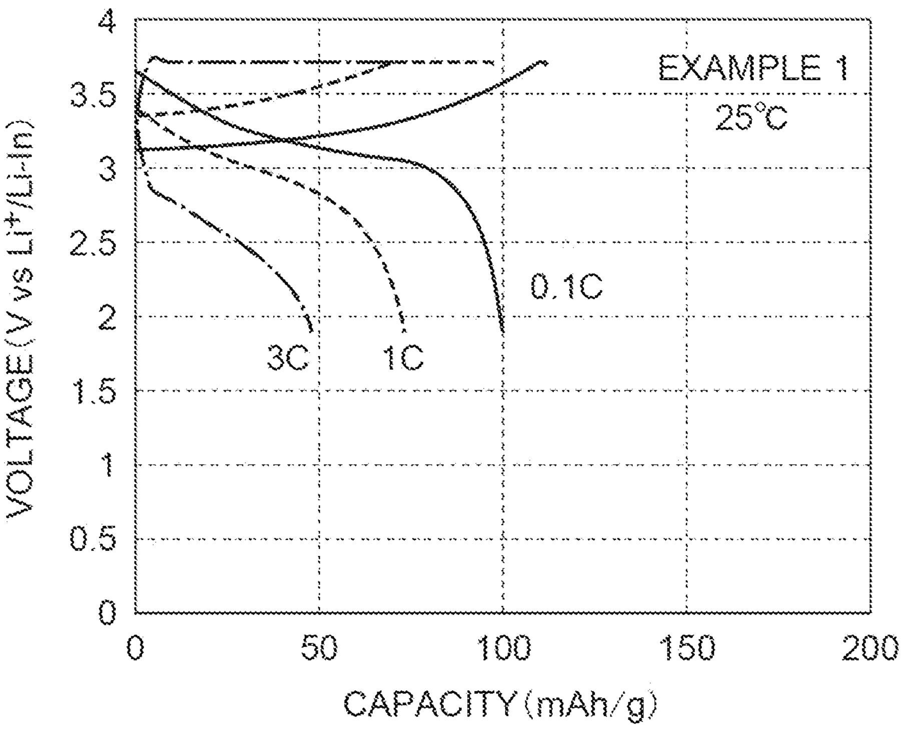
FIG. 3 is a diagram showing the results of a charging and discharging test performed at 25° C. for a lithium ion battery using the lithium-containing chloride of Example 1 as a solid electrolyte.

The charging and discharging test results are shown in FIG. 3.

In addition, Table 3 shows the discharging capacities at 0.1 C, 1 C, and 3 C at 25° C.

Figure 4:
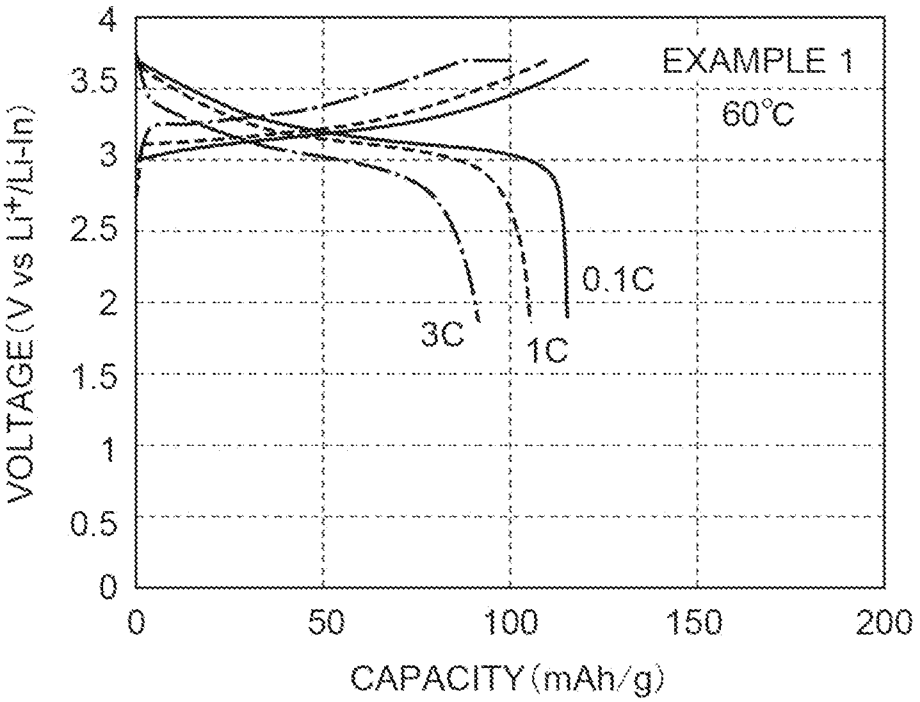
FIG. 4 is a diagram showing the results of a charging and discharging test performed at 60° C. for the lithium ion battery using the lithium-containing chloride of Example 1 as a solid electrolyte.

In addition, as reference data, FIG. 4 shows the results of the charging and discharging test at 60° C.

TABLE 1

| C rate | Current density (mA/cm$^2$) |
|---|---|
| 0.1 C | 0.19 |
| 1 C | 1.9 |
| 3 C | 5.8 |

TABLE 2

| | Preparation composition | ICP composition | Half value width (X rays) (°) | Half value width (NMR) (ppm) | ** Ion conductivity (mS/cm) | Activation energy (eV) |
|---|---|---|---|---|---|---|
| Example 1 | $Li_{2.89}In_{0.91}Zr_{0.096}Cl_6$ | — | 0.25 | 3.59 | 1.76 | 0.319 |
| Example 2 | $Li_3InCl_{5.8}Br_{0.2}$ | $Li_{3.12}InCl_{5.76}Br_{0.16}$ | 0.19 | 6.68 | 1.02 | 0.309 |
| Example 3 | $Li_{2.84}In_{0.92}Zr_{0.098}Cl_6$ | — | 0.25 | 3.63 | 1.27 | 0.309 |
| Example 4 | $Li_{2.75}In_{0.82}Zr_{0.20}Cl_6$ | — | 0.29 | 4.38 | 1.81 | 0.348 |
| Example 5 | $Li_{2.95}In_{0.975}Nb_{0.025}Cl_6$ | — | 0.12 | 3.85 | 2.27 | 0.352 |
| Example 6 | $Li_{2.9}In_{0.95}Nb_{0.05}Cl_6$ | — | 0.22 | — | 1.34 | 0.376 |
| Example 7 | $Li_{2.8}In_{0.9}Nb_{0.1}Cl_6$ | — | 0.15 | — | 1.04 | 0.319 |
| Example 8 | $Li_{2.95}In_{0.975}Nb_{0.025}Cl_{5.95}I_{0.05}$ | — | 0.22 | 4.95 | 1.04 | 0.360 |
| Example 9 | $Li_{2.95}In_{0.975}Ta_{0.025}Cl_6$ | — | 0.13 | 3.51 | 1.98 | 0.324 |
| Example 10 | $Li_{2.9}In_{0.95}Ta_{0.05}Cl_6$ | — | 0.19 | — | 1.75 | 0.341 |
| Example 11 | $Li_{2.9}In_{0.9}Sn_{0.1}Cl_6$ | — | 0.14 | — | 0.979 | 0.363 |
| Comparative Example 1 | $Li_3InCl_6$ | $Li_{3.00}In_{0.99}Cl_{5.68}$ | 2.69 | — | 0.206 | — |
| Comparative Example 2 | $Li_3InCl_6$ | $Li_{3.00}In_{0.95}Cl_{5.59}$ | 0.19 | 7.34 | 0.707 | 0.406 |
| Comparative Example 3 | $Li_3YCl_6$ | — | —* | — | 0.271 | — |
| Comparative Example 4 | $Li_{2.85}In_{0.80}Zr_{0.19}Cl_6$ | — | 0.38 | 3.37 | 0.272 | 0.384 |

*The crystal structure was not monoclinic
** Measured value of ion conductivity at 25° C.

TABLE 3

| | Preparation composition | Discharging capacity at 25° C. and 1 C (mAh/g) | Discharging capacity at 25° C. and 3 C (mAh/g) |
|---|---|---|---|
| Example 1 | $Li_{2.89}In_{0.91}Zr_{0.096}Cl_6$ | 73.5 | 48.7 |
| Example 2 | $Li_3InCl_{5.8}Br_{0.2}$ | — | — |
| Example 3 | $Li_{2.84}In_{0.92}Zr_{0.098}Cl_6$ | 68.6 | 28.9 |
| Example 4 | $Li_{2.75}In_{0.82}Zr_{0.20}Cl_6$ | — | — |
| Example 5 | $Li_{2.95}In_{0.975}Nb_{0.025}Cl_6$ | 128.1 | 95.9 |
| Example 9 | $Li_{2.95}In_{0.975}Ta_{0.025}Cl_6$ | 124.5 | 70.1 |
| Comparative Example 1 | $Li_3InCl_6$ | — | — |
| Comparative Example 2 | $Li_3InCl_6$ | 54.6 | 0.18 |
| Comparative Example 3 | $Li_3YCl_6$ | — | — |
| Comparative Example 4 | $Li_{2.85}In_{0.80}Zr_{0.19}Cl_6$ | — | — |

Example 2

A lithium-containing chloride of Example 2 was obtained in the same manner as in Example 1 except that LiCl, $InCl_3$, and LiBr were used as raw materials and a composition shown in Table 2 was used. Various measurements were performed on the obtained lithium-containing chloride in the same manner as in Example 1. The results are shown in Table 2 and Table 3.

In addition, FIG. 1 shows the X-ray diffraction patterns of the lithium-containing chloride of Example 2, and FIG. 2 shows the solid-state $^6$Li-NMR spectrums.

Example 3

Figure 5:
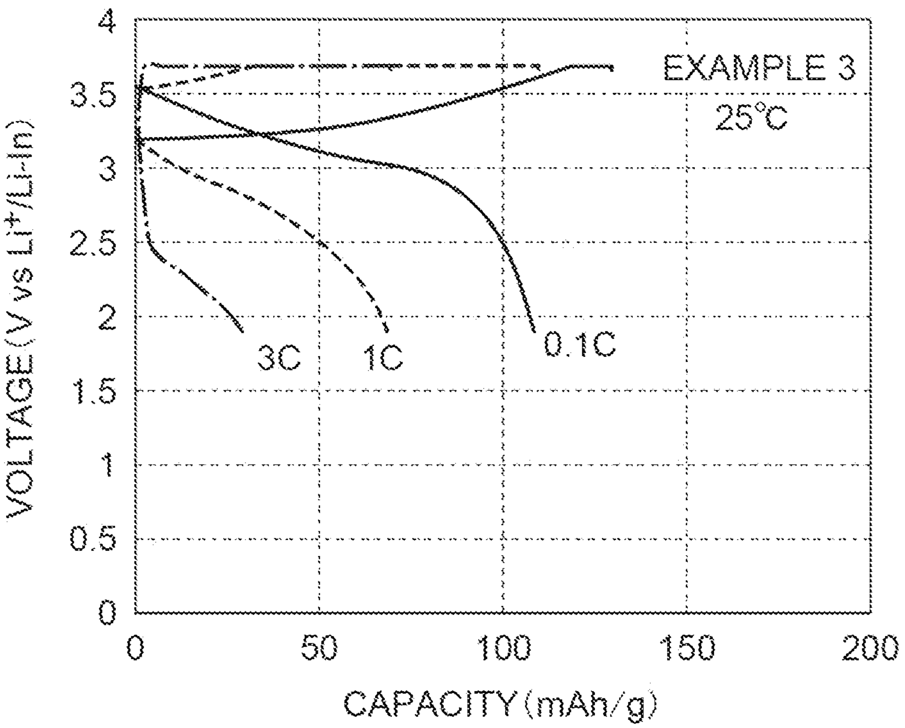
FIG. 5 is a diagram showing the results of a charging and discharging test performed at 25° C. for a lithium ion battery using the lithium-containing chloride of Example 3 as a solid electrolyte.

A lithium-containing chloride of Example 3 was obtained in the same manner as in Example 1 except that a composition shown in Table 2 was used. Various measurements were performed on the obtained lithium-containing chloride in the same manner as in Example 1. The results are shown in Table 2 and Table 3. FIG. 5 shows the results of the charging and discharging test measured at C rates of 0.1 C, 1 C and 3 C at 25° C.

Figure 6:
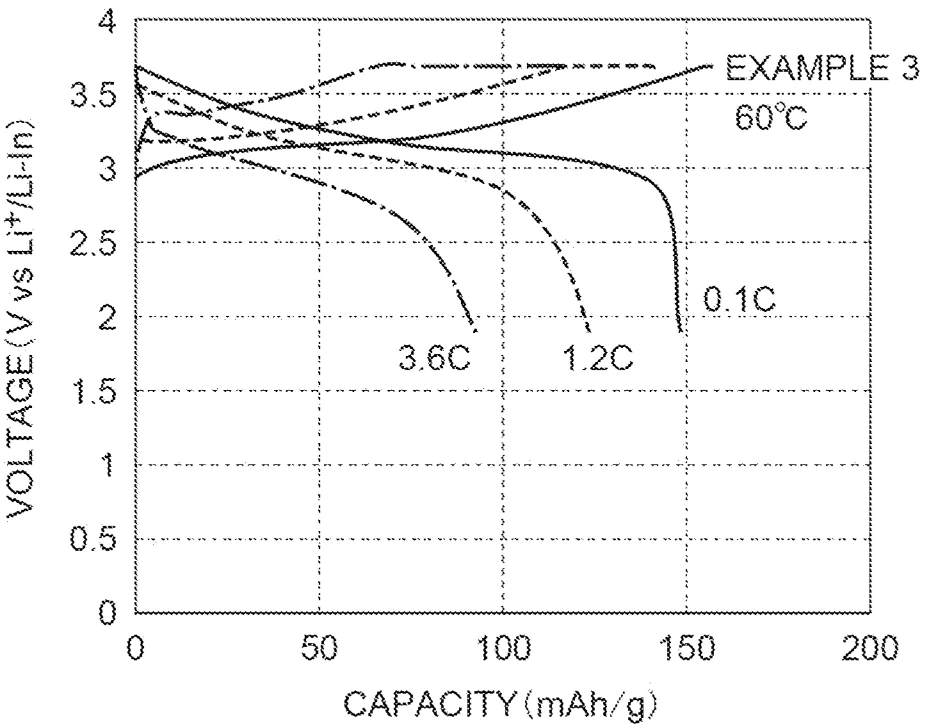
FIG. 6 is a diagram showing the results of a charging and discharging test performed at 60° C. for the lithium ion battery using the lithium-containing chloride of Example 3 as a solid electrolyte.

In addition, as reference data, FIG. 6 shows the results of the charging and discharging test at 0.1 C, 1.2 C, and 3.6 C at 60° C.

Example 4

A lithium-containing chloride of Example 4 was obtained in the same manner as in Example 1 except that a composition shown in Table 2 was used. Various measurements were performed on the obtained lithium-containing chloride in the same manner as in Example 1. The results are shown in Table 2 and Table 3.

Example 5

A lithium-containing chloride of Example 5 was obtained in the same manner as in Example 1 except that LiCl, $InCl_3$, and $NbCl_5$ were used as raw materials, and a composition shown in Table 2 was used. Various measurements were performed on the obtained lithium-containing chloride in the same manner as in Example 1. The results are shown in Table 2 and Table 3.

Figure 9:
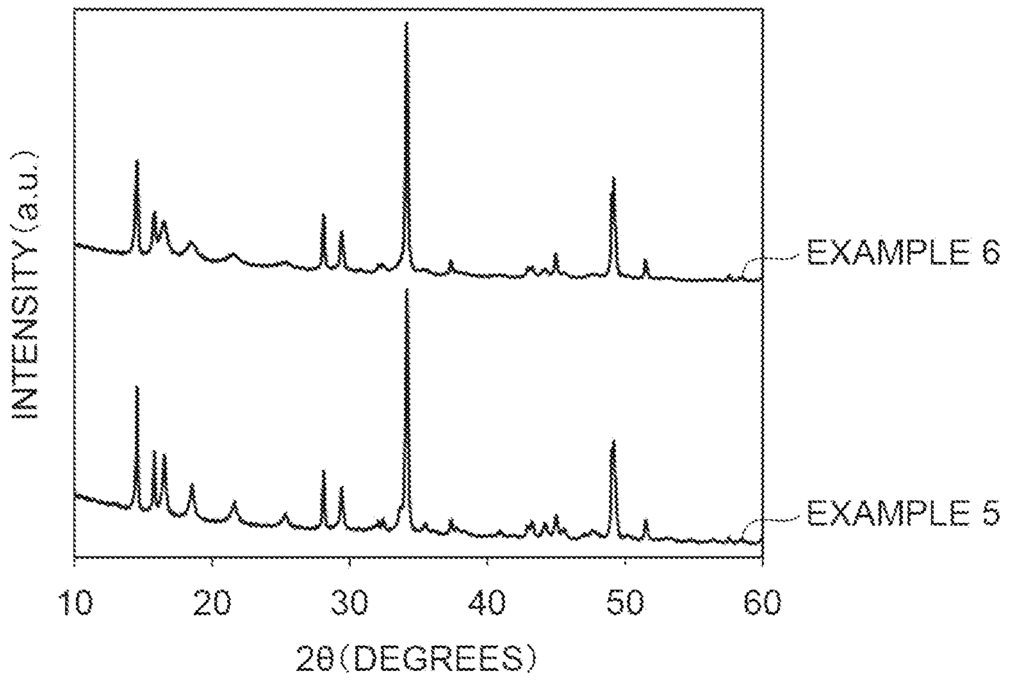
FIG. 9 shows an X-ray diffraction chart of lithium-containing chlorides of Example 5 and Example 6.
Figure 11:
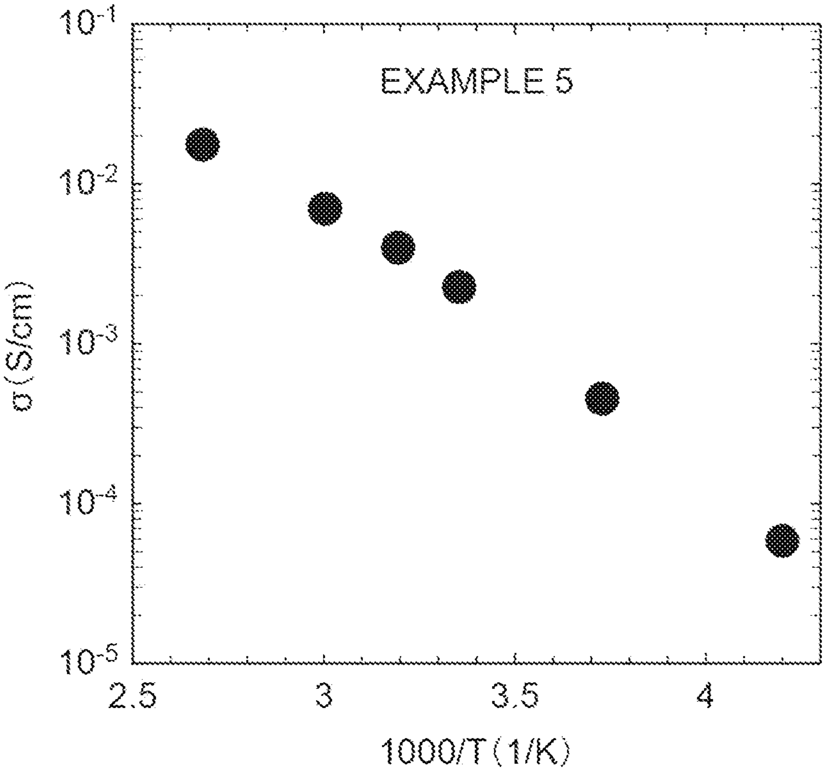
FIG. 11 is a diagram in which the ion conductivity of the lithium-containing chloride of Example 5 is plotted on the ordinate, and the abscissa represents 1000/T[1/K].

The X-ray diffraction patterns of lithium-containing chloride of Example 5 are shown in FIG. 9. In addition, FIG. 11 shows a diagram in which the ion conductivity of the lithium-containing chloride of Example 5 is plotted on the ordinate, and the abscissa represents 1000/T[1/K].

Figure 12:
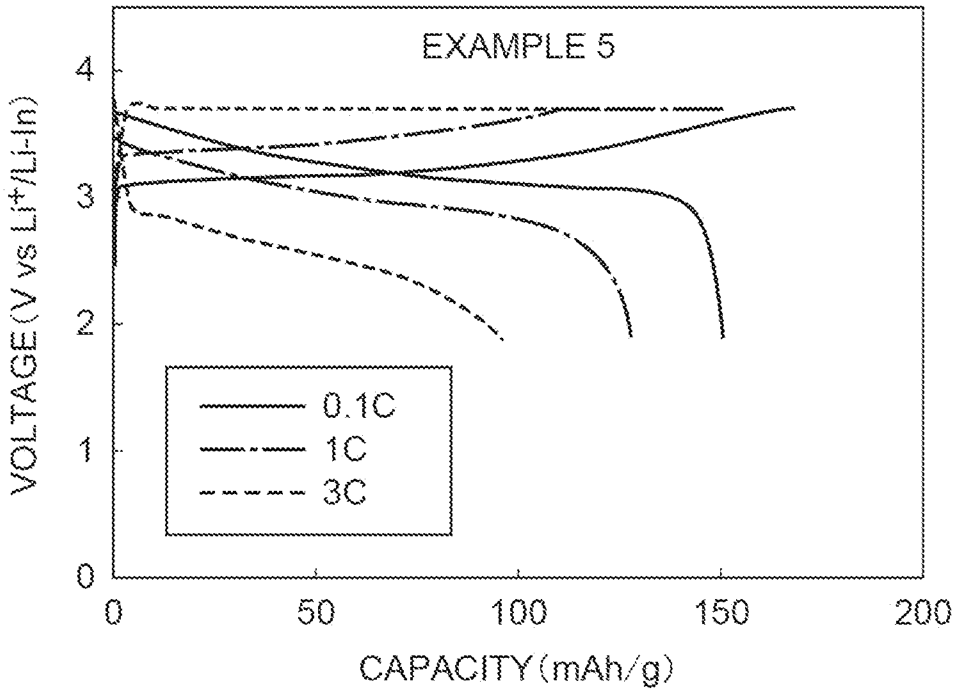
FIG. 12 is a diagram showing the results of a charging and discharging test performed at 25° C. for a lithium ion battery using the lithium-containing chloride of Example 5 as a solid electrolyte.
Figure 14:
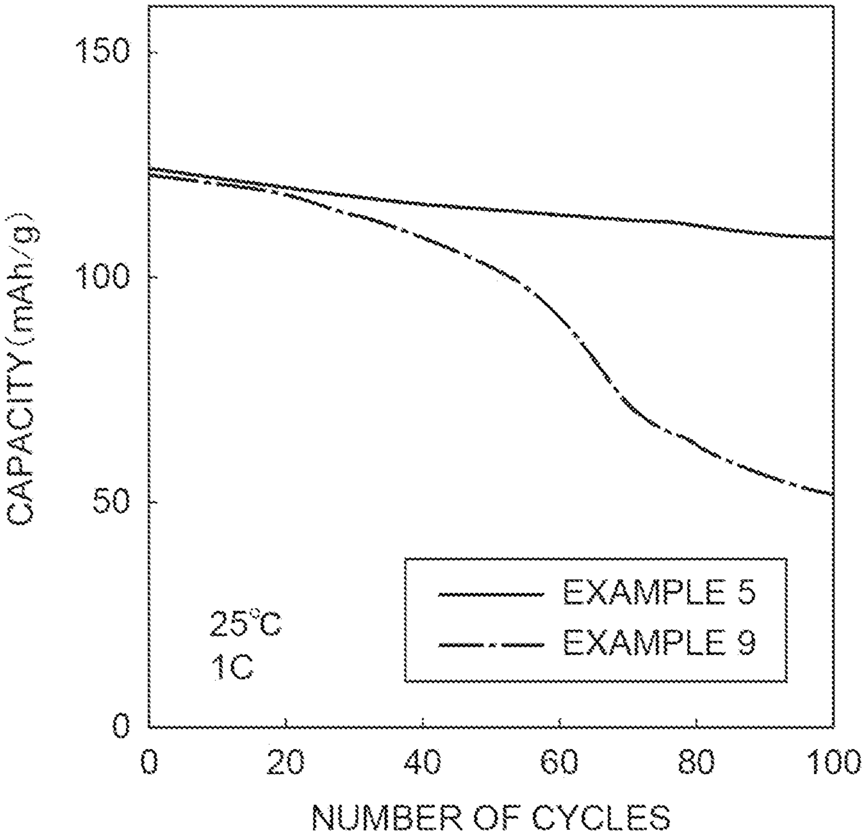
FIG. 14 is a diagram showing the results of the dependence of the discharging capacity on cycles obtained by performing a charging and discharging cycle test on secondary batteries of Example 5 and Example 9 at a C rate of 1 C.

A secondary battery was produced using the lithium-containing chloride of Example 5 in the same method as in Example 1. The produced secondary battery was subjected to the charging and discharging test at 0.1 C, 1 C, and 3 C at 25° C. under the same conditions as in Example 1. The results of the charging and discharging test of the secondary battery of Example 5 are shown in FIG. 12. In addition, the secondary battery of Example 5 was subjected to the charging and discharging cycle test at a C rate of 1 C, and the dependence of the discharging capacity on cycles was examined. The results are shown in FIG. 14.

Example 6

A lithium-containing chloride of Example 6 was obtained in the same manner as in Example 1 except that LiCl, $InCl_3$, and $NbCl_5$ were used as raw materials, and a composition shown in Table 2 was used. Various measurements were performed on the obtained lithium-containing chloride in the same manner as in Example 1. The results are shown in Table 2.

In addition, the X-ray diffraction patterns of lithium-containing chloride of Example 5 are shown in FIG. 9.

Example 7

A lithium-containing chloride of Example 7 was obtained in the same manner as in Example 1 except that LiCl, $InCl_3$, and $NbCl_5$ were used as raw materials, and a composition shown in Table 2 was used. Various measurements were performed on the obtained lithium-containing chloride in the same manner as in Example 1. The results are shown in Table 2.

Example 8

A lithium-containing chloride of Example 8 was obtained in the same manner as in Example 1 except that LiCl, $InCl_3$, $NbCl_5$, and LiI were used as raw materials, and a composition shown in Table 2 was used. Various measurements were performed on the obtained lithium-containing chloride in the same manner as in Example 1. The results are shown in Table 2.

Example 9

A lithium-containing chloride of Example 9 was obtained in the same manner as in Example 1 except that LiCl, $InCl_3$, and $TaCl_5$ were used as raw materials, and a composition shown in Table 2 was used. Various measurements were performed on the obtained lithium-containing chloride in the same manner as in Example 1. The results are shown in Table 2 and Table 3.

Figure 10:
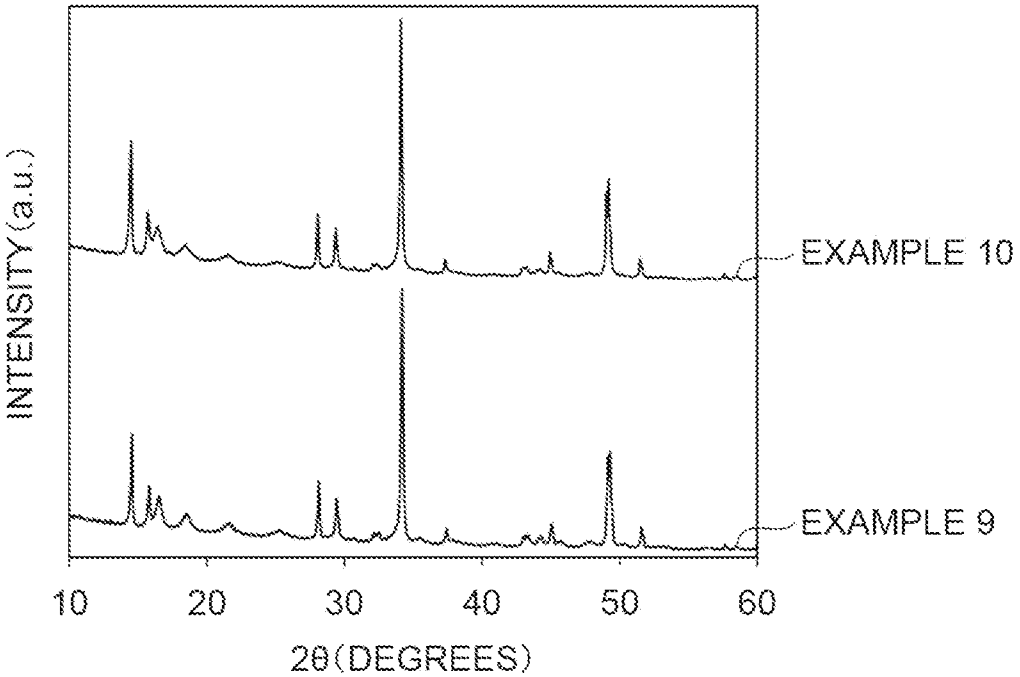
FIG. 10 shows an X-ray diffraction chart of lithium-containing chlorides of Example 9 and Example 10.

In addition, the X-ray diffraction patterns of lithium-containing chloride of Example 9 are shown in FIG. 10.

Figure 13:
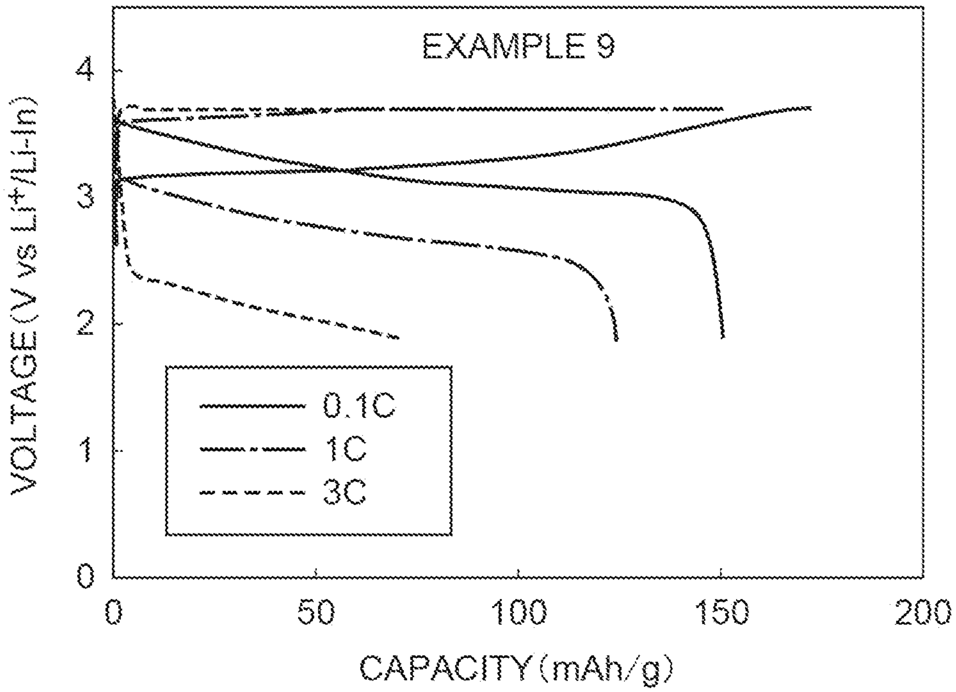
FIG. 13 is a diagram showing the results of a charging and discharging test performed at 25° C. for a lithium ion battery using the lithium-containing chloride of Example 9 as a solid electrolyte.

A secondary battery was produced using the lithium-containing chloride of Example 9 in the same method as in Example 1. The produced secondary battery was subjected to the charging and discharging test at 0.1 C, 1 C, and 3 C at 25° C. under the same conditions as in Example 1. The results of the charging and discharging test of the secondary battery of Example 9 are shown in FIG. 13. In addition, the secondary battery of Example 9 was subjected to the charging and discharging cycle test at a C rate of 1 C, and the dependence of the discharging capacity on cycles was examined. The results are shown in FIG. 14.

Example 10

A lithium-containing chloride of Example 10 was obtained in the same manner as in Example 1 except that LiCl, $InCl_3$, and $TaCl_5$ were used as raw material, and a composition shown in Table 2 was used. Various measurements were performed on the obtained lithium-containing chloride in the same manner as in Example 1. The results are shown in Table 2.

In addition, the X-ray diffraction patterns of lithium-containing chloride of Example 10 are shown in FIG. 10.

Example 11

A lithium-containing chloride of Example 11 was obtained in the same manner as in Example 1 except that LiCl, $InCl_3$, and $SnCl_4$ were used as raw materials, and a composition shown in Table 2 was used. Various measurements were performed on the obtained lithium-containing chloride in the same manner as in Example 1. The results are shown in Table 2.

Comparative Example 1

A lithium-containing chloride of Comparative Example 1 was obtained in the same manner as in Example 1 except that LiCl and $InCl_3$ were used as raw materials, a composition shown in Table 2 was used, and no annealing was performed.

Various measurements were performed on the obtained lithium-containing chloride in the same manner as in Example 1. The results are shown in Table 2 and Table 3. In addition, the X-ray diffraction patterns are shown in FIG. 1.

Comparative Example 2

Figure 7:
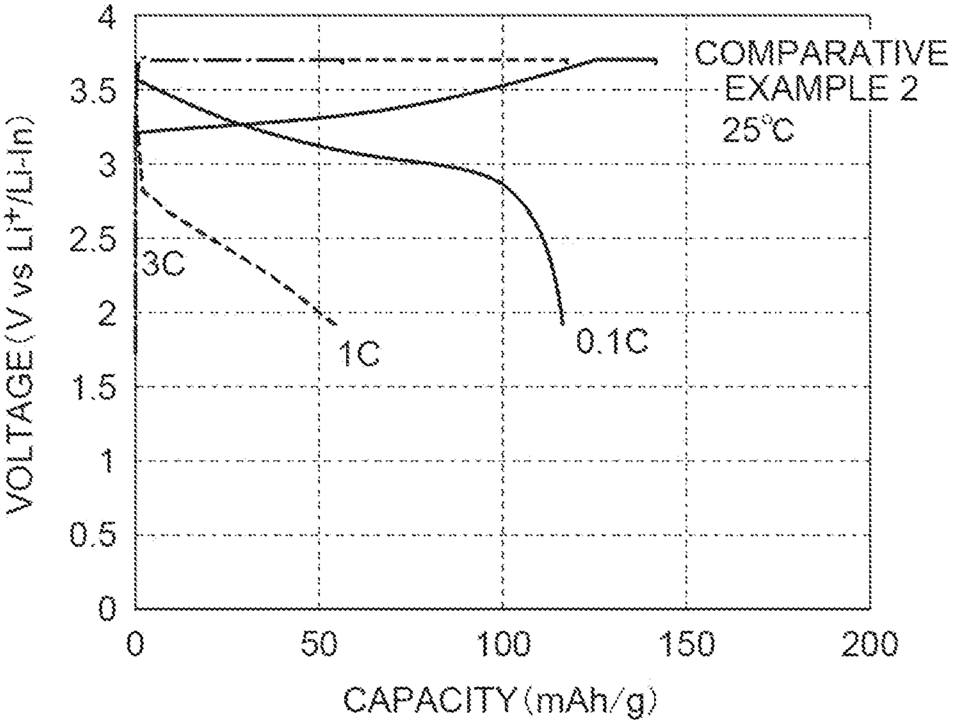
FIG. 7 is a diagram showing the results of a charging and discharging test performed at 25° C. for a lithium ion battery using the lithium-containing chloride of Comparative Example 2 as a solid electrolyte.

A lithium-containing chloride of Comparative Example 2 was obtained in the same manner as in Example 1 except that LiCl and $InCl_3$ were used as raw materials, and a composition shown in Table 2 was used. Various measurements were performed on the obtained lithium-containing chloride in the same manner as in Example 1. The results are shown in Table 2 and Table 3. In addition, FIG. 1 shows the X-ray diffraction patterns, and FIG. 2 shows the solid-state $^{6}$Li-NMR spectrums. FIG. 7 shows the results of the charging and discharging test measured at C rates of 0.1 C, 1 C and 3 C at 25° C.

Figure 8:
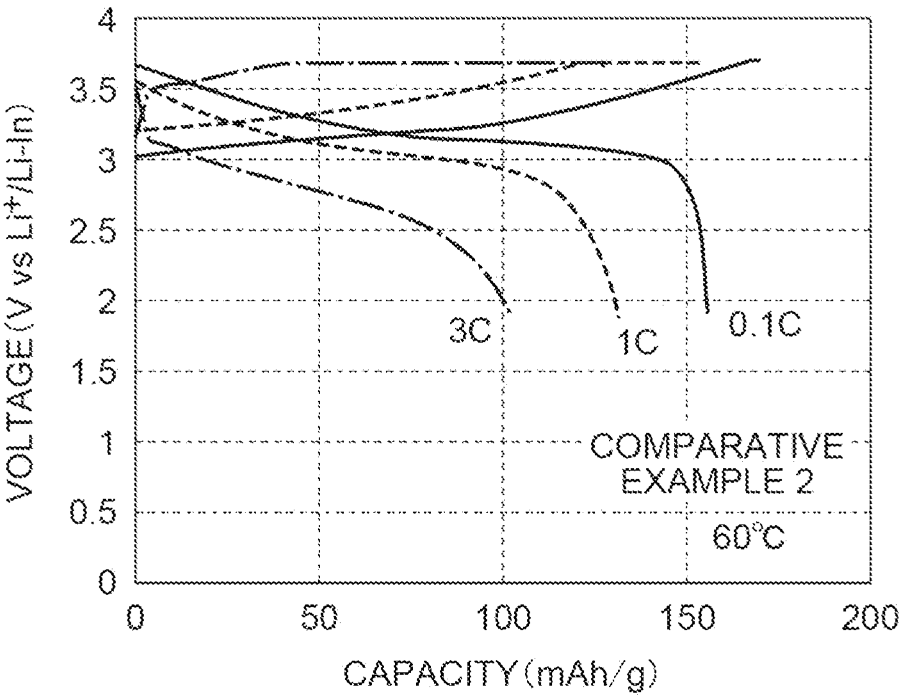
FIG. 8 is a diagram showing the results of a charging and discharging test performed at 60° C. for the lithium ion battery using the lithium-containing chloride of Comparative Example 2 as a solid electrolyte.

In addition, as reference data, FIG. 8 shows the results of the charging and discharging test at 0.1 C, 1 C, and 3 C at 60° C.

Comparative Example 3

A lithium-containing chloride of Comparative Example 3 was obtained in the same manner as in Example 1 except that LiCl and $YCl_3$ were used as raw materials, a composition shown in Table 2 was used, and no annealing was performed.

Various measurements were performed on the obtained lithium-containing chloride in the same manner as in Example 1. The results are shown in Table 2 and Table 3. In addition, the X-ray diffraction patterns are shown in FIG. 1.

Comparative Example 4

A lithium-containing chloride of Comparative Example 4 was obtained in the same manner as in Example 1 except that LiCl, $InCl_3$ and $ZrCl_4$ were used as raw material, a composition shown in Table 2 was used, and annealing was performed in an argon atmosphere under conditions of 260° C. and 5 hours.

Various measurements were performed on the obtained lithium-containing chloride in the same manner as in Example 1. The results are shown in Table 2 and Table 3.

The invention claimed is:

1. A compound having a monoclinic crystal structure wherein, in an X-ray diffraction chart obtained by performing measurement using CuKα ray at 25° C., a half value width of a reflection peak having the greatest peak height in a 2θ angle range of 10 to 18° is 0.05 to 0.35°, and which contains lithium, a metal element M other than lithium, chlorine and a dopant element X, wherein a molar content of lithium is 20 to 40 mol %, wherein a molar content of chlorine is 50 to 70 mol %, and wherein an activation energy is 0.380 eV or less.

2. A compound having a monoclinic crystal structure wherein, in an X-ray diffraction chart obtained by performing measurement using CuKα ray at 25° C., a half value width of a reflection peak having the greatest peak height in a 2θ angle range of 10 to 18° is 0.05 to 0.35°, and which contains lithium, a metal element M other than lithium, chlorine and a dopant element X, wherein a molar content of lithium is 20 to 40 mol %, wherein a molar content of chlorine is 50 to 70 mol %, and wherein, when a solid-state $^{6}$Li-NMR spectrum is measured at room temperature under conditions in which a $^{6}$Li nucleus resonance frequency is 44.1 MHz, and no spinning occurs, a half value width of a peak present within a chemical shift range of −50 to +50 ppm is 1 to 7 ppm, based on a chemical shift of a 1 mol/L LiCl aqueous solution being 1.19 ppm.

3. The compound according to claim 1, which has a crystal structure belonging to a space group C2/m.

4. The compound according to claim 1, wherein the metal element M is a trivalent metal element.

5. The compound according to claim 1, wherein the metal element M is indium.

6. The compound according to claim 1, which is represented by Formula: $Li_{\alpha}M_{\beta}Cl_{6-\delta}X_{\varepsilon}$, where $2 \leq \alpha \leq 3.5$, $0.5 \leq \beta \leq 1.1$, and $0 \leq \delta \leq 1$, $0 < \varepsilon \leq 0.7$.

7. The compound according to claim 1, which is represented by Formula: $Li_{\alpha}In_{\beta}Cl_{6-\delta}X_{\varepsilon}$, where $2 \leq \alpha \leq 3.5$, $0.5 \leq \beta \leq 1.1$, $0 \leq \delta \leq 1$, and $0 < \varepsilon \leq 0.7$.

8. The compound according to claim 1, which is represented by $Li_{\alpha}M_{\beta}Cl_{6-\delta}X1_{\varepsilon 1}X2_{\varepsilon 2}$, where $2 \leq \alpha \leq 3.5$, $0.5 \leq \beta \leq 1$, $0 \leq \delta \leq 1$, $0 < \varepsilon 1 \leq 0.7$, and $0 < \varepsilon \leq 0.7$.

9. A solid electrolyte comprising the compound according to claim 1.

10. A battery comprising the compound according to claim 1.

11. A method for producing the compound according to claim 1, comprising the following steps (1) and (2):

(1) a first step of performing ball milling on raw materials to obtain a crude product; and (2) a second step of annealing the crude product obtained in the first step at a temperature of 100° C. or higher.

* * * * *